US011498255B2

(12) United States Patent
Gupta et al.

(10) Patent No.: US 11,498,255 B2
(45) Date of Patent: Nov. 15, 2022

(54) SYSTEM AND METHOD FOR EXTRUDING COMPOSITE FILAMENT

(71) Applicant: NEW YORK UNIVERSITY, New York, NY (US)

(72) Inventors: Nikhil Gupta, Ossining, NY (US); Brooks Saltonstall, Brooklyn, NY (US); Ashish Kumar Singh, Brooklyn, NY (US)

(73) Assignee: NEW YORK UNIVERSITY, New York, NY (US)

( * ) Notice: Subject to any disclaimer, the term of this patent is extended or adjusted under 35 U.S.C. 154(b) by 265 days.

(21) Appl. No.: 16/772,223

(22) PCT Filed: Dec. 17, 2018

(86) PCT No.: PCT/US2018/065903
§ 371 (c)(1),
(2) Date: Jun. 12, 2020

(87) PCT Pub. No.: WO2019/118954
PCT Pub. Date: Jun. 20, 2019

(65) Prior Publication Data
US 2021/0086427 A1    Mar. 25, 2021

Related U.S. Application Data

(60) Provisional application No. 62/599,166, filed on Dec. 15, 2017.

(51) Int. Cl.
*B29C 48/00* (2019.01)
*B33Y 70/00* (2020.01)
(Continued)

(52) U.S. Cl.
CPC ...... *B29C 48/0013* (2019.02); *B29C 48/0022* (2019.02); *B29C 48/59* (2019.02);
(Continued)

(58) Field of Classification Search
CPC ............ B29C 48/0013; B29C 48/0022; B29C 48/802
See application file for complete search history.

(56) References Cited

U.S. PATENT DOCUMENTS

| 4,721,589 A | 1/1988 | Harris |
| 9,566,736 B2 | 2/2017 | Valdmaa |
| 2016/0200025 A1 | 7/2016 | Wassmer |

OTHER PUBLICATIONS

Deng, et al., Energy Monitoring and Quality Control of a Single Screw Extruder, Applied Energy, vol. 113, 26, Sep. 2013, pp. 1775-1785.
(Continued)

*Primary Examiner* — James Sanders
(74) *Attorney, Agent, or Firm* — Riverside Law LLP

(57) ABSTRACT

A method of extruding filament comprises the steps of cutting a bulk source material into pieces having size $S_1$, performing a first extrusion pass comprising the steps of melting the pieces in an extruding device at a temperature $T_1$ and extruding a first filament at an extrusion speed $V_1$, and performing at least one additional extrusion pass k comprising the steps of cutting the first filament into pieces having size $S_k$, melting the pieces in an extruding device at temperature $T_k$, and extruding a final filament at an extrusion speed $V_k$. A system for extruding filament is also described.

12 Claims, 19 Drawing Sheets

(51) Int. Cl.
　　*B29C 48/92*　　　(2019.01)
　　*B29C 48/59*　　　(2019.01)
　　*B29C 48/80*　　　(2019.01)
　　*B29C 48/88*　　　(2019.01)

(52) U.S. Cl.
　　CPC .......... *B29C 48/802* (2019.02); *B29C 48/911* (2019.02); *B29C 48/92* (2019.02); *B33Y 70/00* (2014.12); *B29C 2948/9238* (2019.02); *B29C 2948/92209* (2019.02); *B29C 2948/92704* (2019.02); *B29C 2948/92876* (2019.02)

(56) References Cited

OTHER PUBLICATIONS

Mich, How to Make DIY Filament for your 3D Printer [online]. May 22, 2014 (retrieved Feb. 20, 2019) Retrieved from http://3dprintingforbeginners.com/how-to-make-diy-filament-for-your-3d-printer/ (24 pages).

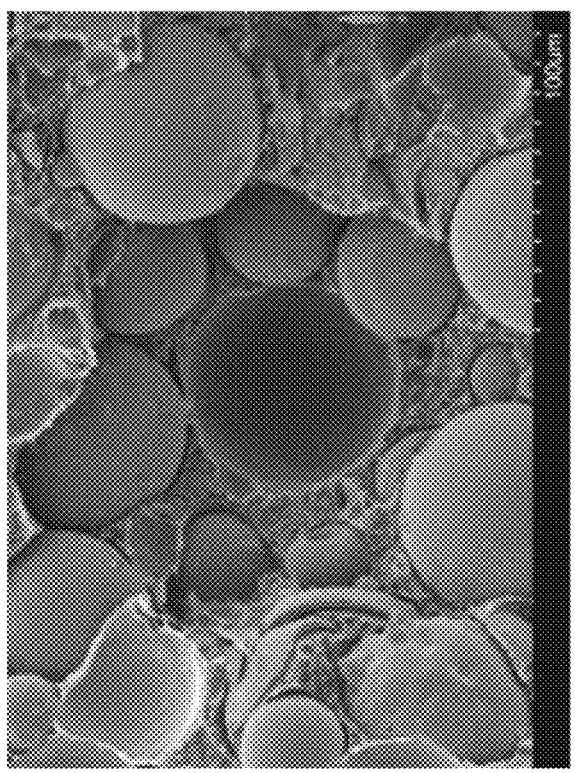
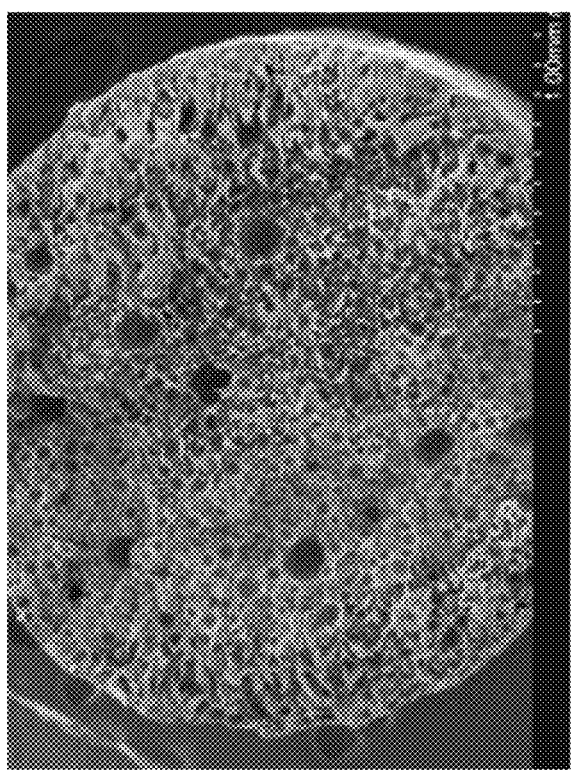
Fig. 16A
Fig. 16B
Fig. 16

Fig. 17A
Fig. 17B
Fig. 17

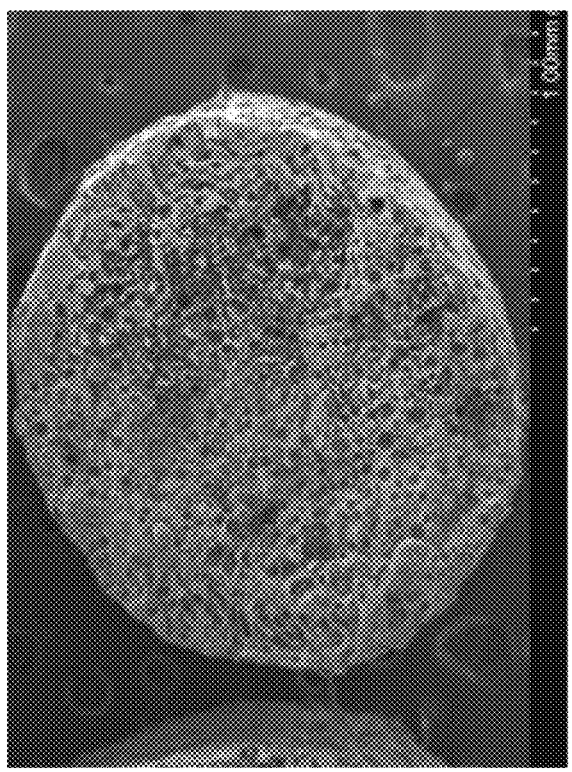
Fig. 18A
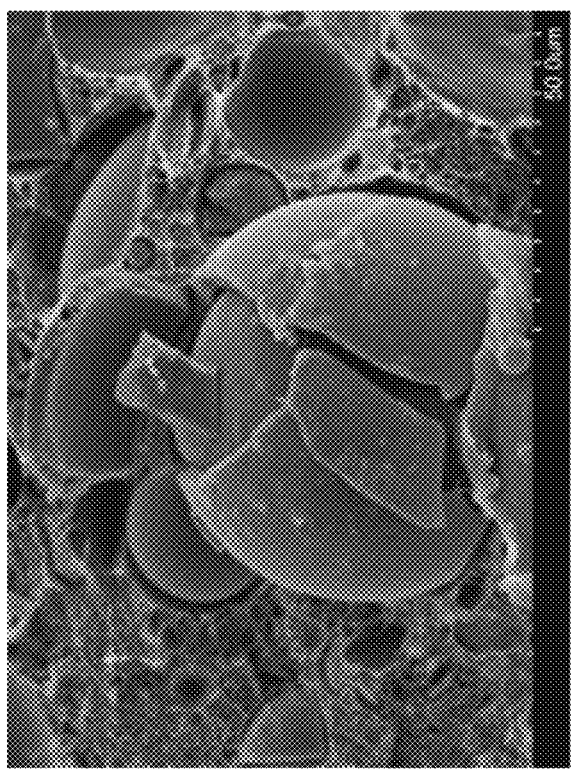
Fig. 18B
Fig. 18

SYSTEM AND METHOD FOR EXTRUDING COMPOSITE FILAMENT

CROSS-REFERENCE TO RELATED APPLICATIONS

This application is a U.S. national phase application filed under 35 U.S.C. § 371 claiming benefit to International Patent Application No. PCT/US2018/065903, filed Dec. 17, 2018, which is entitled to priority under 35 U.S.C. § 119(e) to U.S. Provisional Patent Application No. 62/599,166, filed Dec. 15, 2017, each of which applications is hereby incorporated herein by reference in its entirety.

STATEMENT REGARDING FEDERALLY SPONSORED RESEARCH OR DEVELOPMENT

This invention was made with government support under grant No. N00014-10-1-0988 awarded by the Office of Naval Research. The government has certain rights in the invention.

BACKGROUND OF THE INVENTION

Light weight composite materials such as polymer matrix syntactic foams have been used ubiquitously in the aerospace, marine and automotive industries for decades due to their high strength-to-density ratios. With the advent of additive manufacturing (AM) techniques or 3D printing, efforts are being made to manufacture parts from syntactic foams using 3D printing, which offers greatly increased flexibility in manufacturing. Compared to conventional subtractive manufacturing, AM offers quick prototyping, easy design changes, and fabrication of complex geometries that are otherwise impossible to make with previously-known techniques. Previously-used polymer-based syntactic foam is abundant, and so methods of recycling and reusing such materials for 3D printed parts offer economic and environmental benefits.

Current laboratory-scale filament extruders often produce poor quality filament with inconsistent cross-sectional area, prone to fracture during the 3D printing process and to getting jammed in the nozzle.

In addition, in manufacturing syntactic foam filament, breakage of hollow particles leads to higher than expected extruded filament density, and creates stress concentrations due to the presence of angular ceramic particle fragments. The fragments further cause poor material flow characteristics, leading to extrusion nozzle jamming, and poor quality printed parts. Thus, there is a need in the art for a system and method of extruding syntactic foam and other filaments for 3D printing, and for a method of recycling syntactic foam and other filaments. The present invention satisfies these needs.

SUMMARY OF THE INVENTION

In one aspect, a method of extruding filament comprises the steps of cutting a bulk source material into pieces having size $S_1$, performing a first extrusion pass comprising the steps of melting the pieces in an extruding device at a temperature $T_1$ and extruding a first filament at an extrusion speed $V_1$, and performing at least one additional extrusion pass k comprising the steps of cutting the first filament into pieces having size $S_k$, melting the pieces in an extruding device at temperature $T_k$, and extruding a final filament at an extrusion speed $V_k$.

In one embodiment, the bulk source material comprises polymer matrix syntactic foam. In one embodiment, the bulk source material is HDPE. In one embodiment, the method further comprises the steps of monitoring at least one temperature on the extruding device, and activating at least one heater in order to maintain the at least one temperature substantially constant. In one embodiment, each extrusion pass further comprises the step of grinding the pieces of size $S_1$ into fine powder with particle size smaller than 1 mm in any dimension. In one embodiment, the final filament has a density increase of at least 5% compared to the density of the bulk source material. In one embodiment, $T_1$ and $T_k$ are between 85° C. and 150° C. In one embodiment, $S_1$ is less than 3 mm×3 mm×3 mm. In one embodiment, $V_1$ and $V_k$ are between 1 mm/sec and 2 cm/sec. In one embodiment, $T_1$ and $T_k$ are different values. In one embodiment, $S_1$ and $S_k$ are different values. In one embodiment, $V_1$ and $V_k$ are different values.

In another aspect, a system for extruding filament, comprises an extrusion channel having a distal and a proximal end, with an extrusion die having an outlet at the distal end of the channel, a hopper fluidly connected to the channel between the distal and proximal ends, the hopper configured to accept a source material and feed the source material into the channel, a motor at near the proximal end of the channel, configured to drive the source material toward the distal end of the channel, at least one heater capable of heating at least a portion of the channel length starting from the distal end of the channel, a cooling device positioned near the outlet of the extrusion die, configured to cool the filament, and a controller electrically connected to the at least one heater, the motor, and the cooling device, and configured to melt the source material and extrude the molten source material from the outlet of the extrusion die.

In one embodiment, the system further comprises at least one relay electrically connected to the controller, wherein the relay is configured to supply power to one of the group consisting of the at least one heater and the motor. In one embodiment, the system further comprises a cooling device positioned near the outlet of the extrusion die, configured to cool the filament. In one embodiment, the extrusion die has an outlet diameter of less than 3 mm.

In one embodiment, the system further comprises at least one temperature sensor configured to communicate at least one temperature reading to the controller, positioned near the at least one heater, wherein the controller is further configured to maintain at least one steady temperature by switching the at least one heater on and off according to the at least one temperature reading received. In one embodiment, the at least one steady temperature is between 115 and 132° C. In one embodiment, the system further comprises an extrusion rate sensor communicatively connected to the controller, wherein the controller is further configured to maintain a substantially constant rate of extrusion by changing a setting of one of the group consisting of the motor and the at least one heater. In one embodiment, the system further comprises an extrusion quality sensor communicatively connected to the controller, wherein the controller is further configured to maintain a substantially constant filament quality by changing a setting of one of the group consisting of the motor and the at least one heater.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 16, consisting of FIGS. 16A and 16B, is scanning electron microscope images of cross sections of extruded filaments;

FIG. 17, consisting of FIGS. 17A and 17B, is scanning electron microscope images of cross sections of extruded filaments; and FIG. 18, consisting of FIGS. 18A and 18B, is scanning electron microscope images of cross sections of extruded filaments.

DETAILED DESCRIPTION

Figure 1:
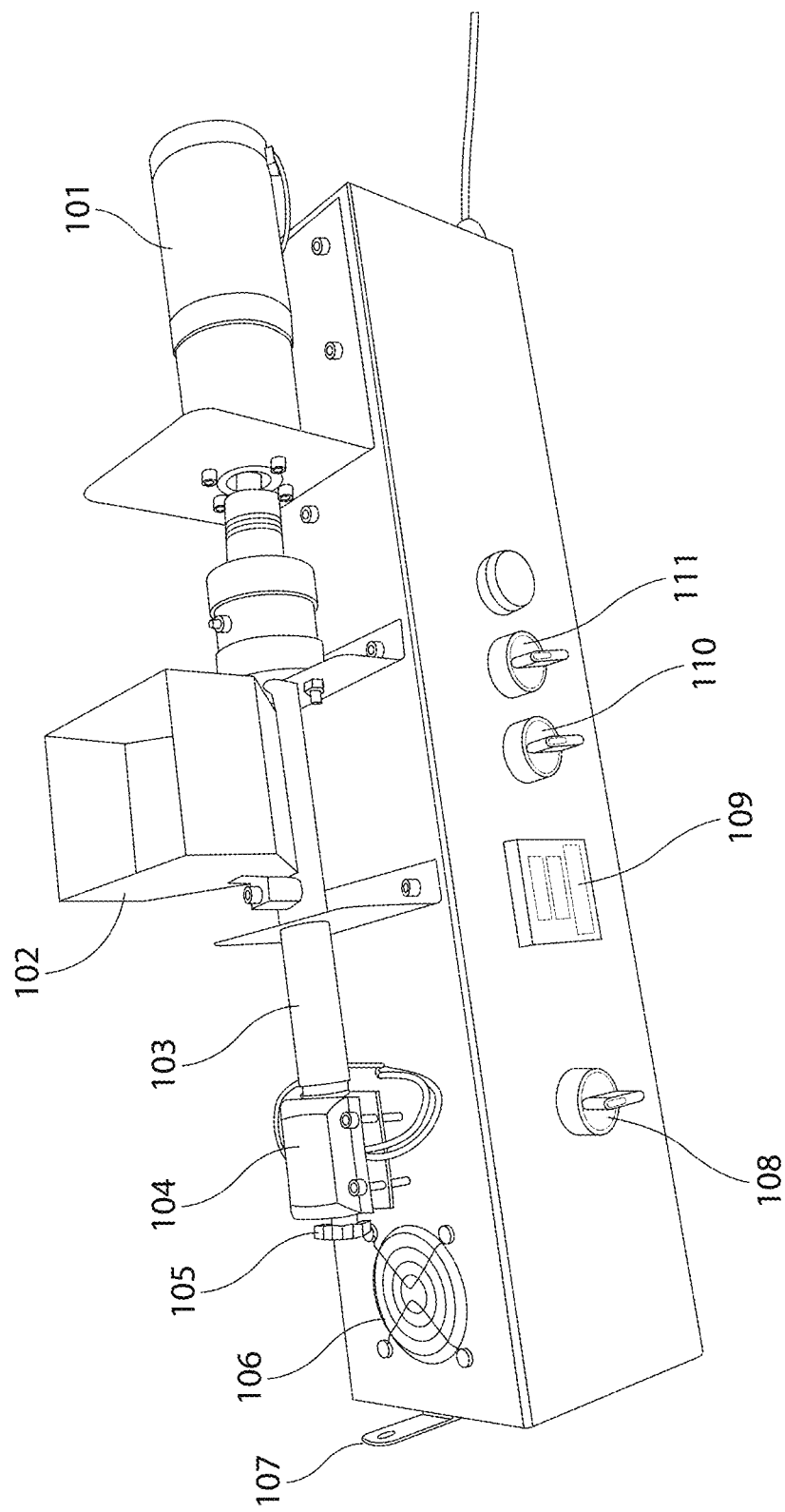
FIG. 1 is a diagram of an exemplary extrusion device.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C #, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

The present invention relates in part to the recyclability of thermoplastic-based syntactic foam and other materials used in additive manufacturing, and the effects of processing on the constituents of such materials. In one embodiment, High-Density Polyethylene (HDPE) and fly-ash cenosphere foam (40% wt. fly-ash) may be processed into filaments for fused deposition modelling (FDM).

In some embodiments, methods of the present invention comprise the step of mixing hollow particles in a thermoplastic resin, and forming pellets from the mixture of a size capable of being fed into an extruder. In other embodiments, a bulk source material with hollow particles already mixed in is made available, and that bulk source material is cut into pieces of a size capable of being fed into an extruder.

One aspect of the present invention relates to a filament extruded by a system or method of the present invention. In one embodiment, a filament of the present invention comprises a plurality of hollow particles and a quantity of syntactic foam. In one embodiment, the plurality of hollow particles are substantially uniformly distributed in the extruded filament, such that a cross-sectional view of the extruded filament will show a substantially uniform two-dimensional distribution of the hollow particles in the filament. In some embodiments, some or all of the density, modulus and strength of the extruded filament are substantially the same as or superior to those of injection molded material of the same composition.

Aspects of the present invention relate to a system for extruding recycled plastic. With reference now to FIG. 1, an exemplary plastic extrusion system is shown. Source material is placed in hopper 102, which is then conveyed along barrel 103 by motor 101, which rotates a screw (not shown) within barrel 103. Motor 101 is activated, and its speed regulated, by motor switch 111. In some embodiments, the system extrudes 1.7 mm diameter plastic filament at a speed of 10 mm/sec. The extruded filament may be any suitable diameter, in some embodiments between 1.7 mm and 3 mm. Source material moves along barrel 103 toward heating element 104, where it is melted and forced through extrusion nozzle 105. The temperature of heating element 104 is regulated by a thermostatic temperature controller, for example a TA4-SNR temperature controller. The temperature controller has one or more settings, which may be manipulated by a user, for example with switch 110. Although a motor is shown in the embodiment of FIG. 1, it is understood that other means may be used to propel the source material along the channel toward the extrusion die, including but not limited to pressurized air, a hydraulic or electromagnetic piston, centrifugal force, or any other suitable propulsion mechanism known in the art.

Heating element 104 may comprise any controlled heating device known in the art, including but not limited to an electric resistance heater, a combustion heater, or a heater using steam or water circulation. In some embodiments, the heating element may heat the material to a temperature between 70° C. and 120° C. In some embodiments, the temperature may vary depending on the molecular weight and melting temperature of the material. The current temperature or the one or more settings may be displayed on temperature gauge 109. Alternatively, control and telemetry signals may be conveyed to a remote control and monitoring system via one or more wired or wireless networks. In one embodiment, the extrusion system is fully controlled remotely, but in another embodiment, only some functions are controlled and parameters monitored remotely. The heating controller may likewise comprise a set of instructions stored on a non-transitory computer-readable medium that, when executed by a processor, performs some or all steps of a method of the present invention. Once extruded, the filament is cooled by a cooling device. In the embodiment of FIG. 1, the cooling device is fan 106, but it is understood that the cooling device can be any suitable cooling device, including but not limited to a cooling ring, air cooling, water bath cooling, liquid nitrogen cooling, dry ice cooling, or any other suitable cooling method known in the art. All applicable cooling methods may be applied in various ways for different materials. The thread is then guided away from the system with filament guide 107.

Figure 2A:
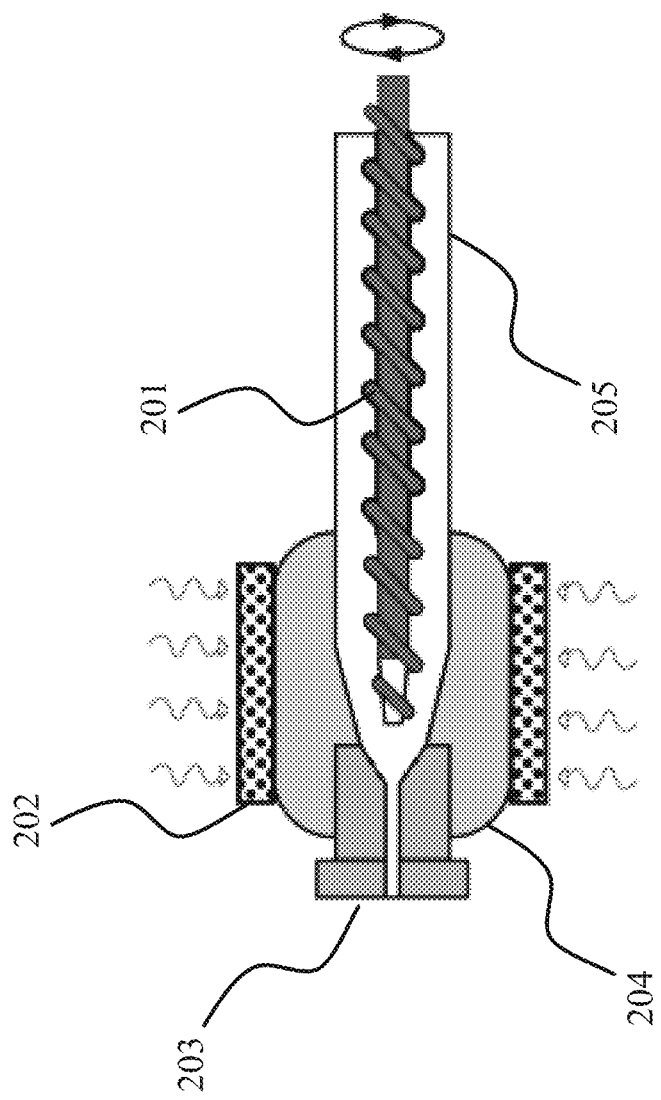
FIG. 2A is a cross-sectional view of an end of an exemplary extrusion device.

Referring now to FIG. 2A, a cross-sectional view of the extruding end of an exemplary plastic extrusion system is shown. In this view, internal screw 201 is visible. Screw 201 forces source material down the channel 205, toward extrusion die 203. Die mount 204 holds die 203 in place, while also tapering channel 205 down to the appropriate diameter. The filament is formed by melting the source material, facilitated by first heater 202. FIG. 2A is not meant to represent exact or proportional scale of any parts, and it is understood that the inner diameter (ID) of the channel may vary from 2-5 times the diameter of the extrusion outlet. Likewise, in embodiments of the invention using a screw to propel the source material, screws having a thread spacing in the range of 0.5-2 inches may be used depending on barrel length and mixing speed.

Figure 2B:
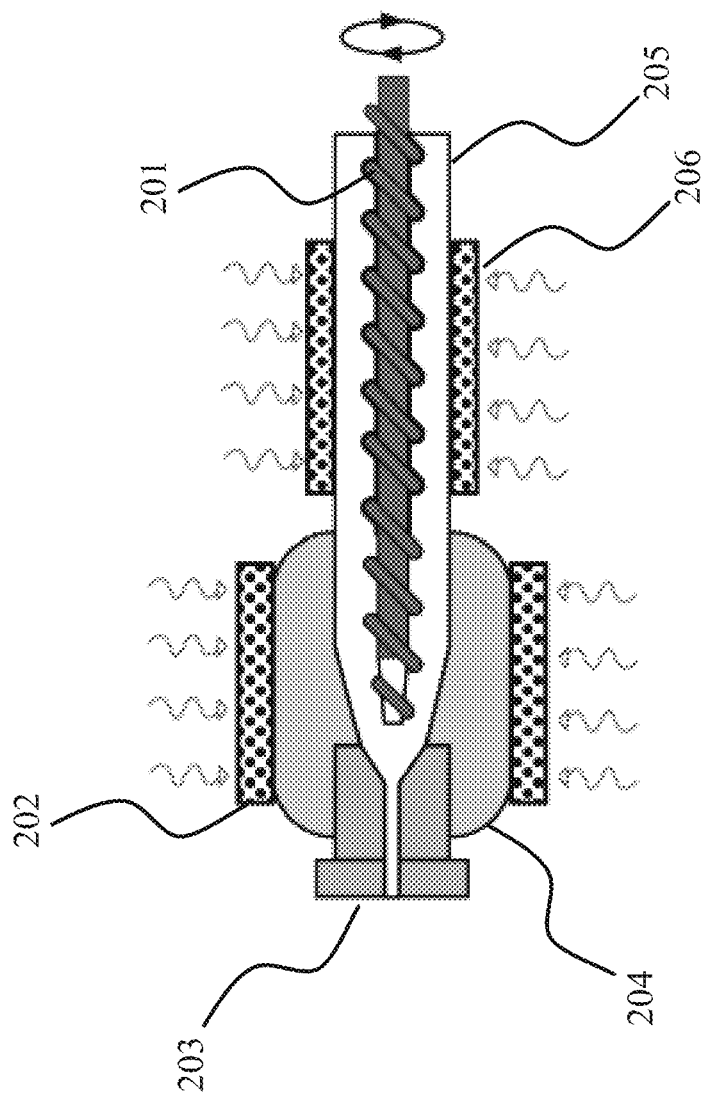
FIG. 2B is a cross-sectional view of an end of an exemplary extrusion device.

Referring now to FIG. 2B, a modified extruding end of an exemplary plastic extrusion system of the present invention is shown. The system of FIG. 2B is identical to FIG. 2A except that the system of FIG. 2B uses a second heater 206 along channel 205, in addition to first heater 202. Adding second heater 206 advantageously provides a longer heat cycle, which allows more time for heating and mixing the source material. Lower thermal gradients between channel 205 and die mount 204 also lead to more uniform heating, which vastly reduces or eliminates the incidence of solid artifacts in the extruded filament.

In some embodiments, the system of the present invention comprises at least one heater, configured to apply heat along a length of the channel. In some embodiments, the length of the channel to be heated begins at or near the distal end of the channel, near the extrusion die. Where the system comprises a plurality of heaters, the heaters may be in direct contact with one another along the length of the channel, or there may be a space between some or all of the heaters. In some embodiments, each heater of the plurality of heaters may be independently controlled, but the heaters may also be controlled together. The heaters may be held at the same temperature or at different temperatures. In some embodiments, the heater or heaters may be held at a higher temperature initially, then a lower temperature after extrusion is underway.

Heater control systems may comprise one or more thermal couples or other temperature sensors, which may be positioned on or near the heater or heaters. In one embodiment, one or more temperature sensors are integrated into the heater or heaters. In another embodiment, one or more temperature sensors comprise a thermal imaging system that is able to approximate the temperature in different parts of the system without direct contact. Heater control systems of the present invention may control electric heaters by any suitable control means, including but not limited to solid-state relays (SSRs), hybrid relays, thermal relays, reed relays, field-effect transistors (FETs), mechanical switches, or any other high-power switching mechanism known in the art. Where non-electric heating means are used, control systems may comprise one or more electronically- or thermostatically-actuated valves for controlling the flow of combustible fuel, steam, or water. In some embodiments, control systems of the present invention comprise one or more single board computers (SBCs) such as an Arduino™. Control systems of the present invention may comprise any computing device known in the art capable of receiving and processing analog or digital inputs, either directly or relayed over a computer network.

Figure 3:
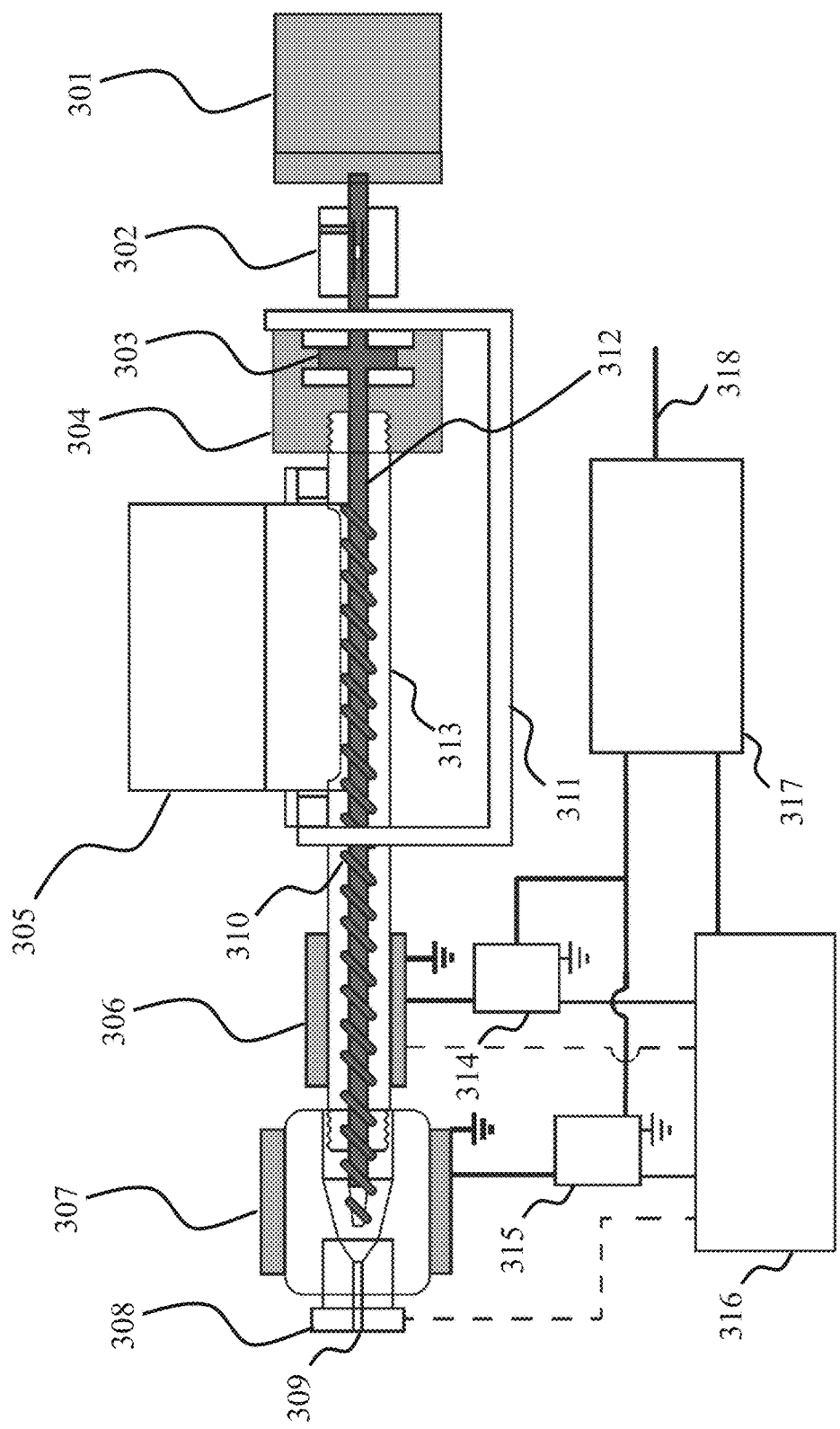
FIG. 3 is a system diagram of an exemplary extrusion device.

Referring now to FIG. 3, a cross-sectional view of one embodiment of a system of the present invention is shown in conjunction with a basic electrical diagram. Motor 301 drives shaft 312, which comprises screw 310 within channel 313. Motor 301 is coupled to shaft 312 via couplings 302 and 304, and shaft 312 is held in place with bearing 303. The drive apparatus is held stable with respect to hopper 305 by support bracket 311. Source material is inserted into the top of hopper 305, and is then conveyed along channel 313 by screw 310. Source material is then melted by heaters 306 and 307, and the molten source material is forced through die 308 and out of outlet 309 to form a continuous, uniform filament. Heaters 306 and 307 are controlled by controller 316, which is electrically connected to heaters 306 and 307 via solid state relays 314 and 315. In this embodiment, power is supplied to controller and to heaters 306 and 307 from mains power supply 318, through AC/DC converter 317.

Some embodiments of the system of the present invention may be manually or automatically adaptable for different source materials. For example, one embodiment of the present invention may include one or more sensors positioned to monitor the extrusion rate and quality of the extruded filament. Where filament quality is measured as poor, or where the rate of extrusion is slower or faster than anticipated, a control system of the present invention may increase or decrease the speed of the motor or other source material propulsion means in order to increase or decrease the extrusion speed or increase the extrusion quality. Additionally or alternatively, the temperature of one or more heaters of the system may be adjusted in order to achieve optimal thermal conditions based on the source material.

In one embodiment, a method of the present invention relates to recycling source material to create a filament of substantially uniform diameter, suitable for 3D printing. Starting with raw material of arbitrary size and shape, the material is first broken down into small, substantially uniform pellets. In one embodiment, this is accomplished by first melting the bulk material into one or more substantially flat plates. The plate can be of arbitrary length and width, but is ideally of substantially uniform height. In some embodiments, the height of a plate according to this method is less than 3 mm. In other embodiments, the height of the plate is less than 2 mm. In some embodiments, the one or more plates are flattened with a rolling device or a hydraulic press to ensure uniform thickness.

Next, the one or more plates are cut into strips having a maximum width, and the strips are then further cut into pellets having a maximum length. In one embodiment, none of the length, width, or height of the finished pellets exceeds 3 mm. In another embodiment, no dimension of the pellets exceeds 2 mm. In another embodiment, the maximum dimension is determined based on the pitch of the extrusion screw used in the extruder, so as to minimize jamming.

Illustrations of an exemplary embodiment of the above process are shown in FIG. 4. HDPE/fly-ash composite is first melted into plate (FIG. 4A), which is cut with a band saw into strips (FIG. 4B). The strips are then cut into pellets (FIG. 4C). Finished pellets are shown in FIG. 4D.

Once the source material has been prepared, a set of n extrusion passes is performed. A first extrusion pass is performed according to a set of parameters, which may vary based on the material used, the hollow particle size, volume fraction, or wall thickness. In some embodiments, the first pass may use pellets of size $S_1$, an extrusion speed $V_1$, and m heaters applying heat at target temperatures $T_{1,1}$ through $T_{1,m}$. A second pass could then use parameters $S_2$, $V_2$, $T_{2,1}$ through $T_{2,m}$ and so on, until the final pass using $S_n$, $V_n$, and $T_{n,1}$ through $T_{n,m}$. Any extrusion device capable of controlling the requisite parameters may be used, for example an extrusion system based on the one discussed above and shown in FIGS. 1-3. In some embodiments, only a single pass is needed and the filament resulting from the first pass is sufficient for use in 3D printing, but typically filament produced from a "single-pass" method is of poor or uneven quality. In embodiments of the present invention, the "pass" of extrusion above may be repeated twice, three times, four times, or more. In some embodiments, after the first or any subsequent pass, the filament is evaluated to determine if there is significant void in the matrix. If evaluation shows void above a certain threshold, another pass is performed.

In a subsequent pass k, different parameters $S_k$, $V_k$, and $T_{k,1}$ through $T_{k,m}$ may be used as appropriate to produce filament of the right quality. As would be understood by a person of ordinary skill in the art, varying the size parameter (S) may require the use of varying methods of cutting or grinding the source material (the filament from the previous pass) in order to achieve the proper particle size. Depending on the characteristics of the source material and the capabilities of the extrusion device, the S parameter may vary from as small as a few hundred microns on a side to as large as 20 mm on a side. The S parameter may also comprise discrete length, width, and height requirements, rather than simply a single not-to-exceed dimension. For example, in one embodiment, the S parameter may be set such that a particle may exceed 10 mm in one dimension, but should not exceed 4 mm in either orthogonal dimension. Similarly, the V parameter may vary from as slow as 0.5 mm per second to as fast as multiple centimeters per second. The T parameters may vary from 60° C. to 150° C., or may vary more widely depending on the melting temperature of the polymer used. Although it is possible to vary the parameters in a subsequent pass, it may also be desirable to maintain some or all of the parameters S, V, and T at the same value for some or all of the passes in the multi-pass extrusion.

Figure 5B:
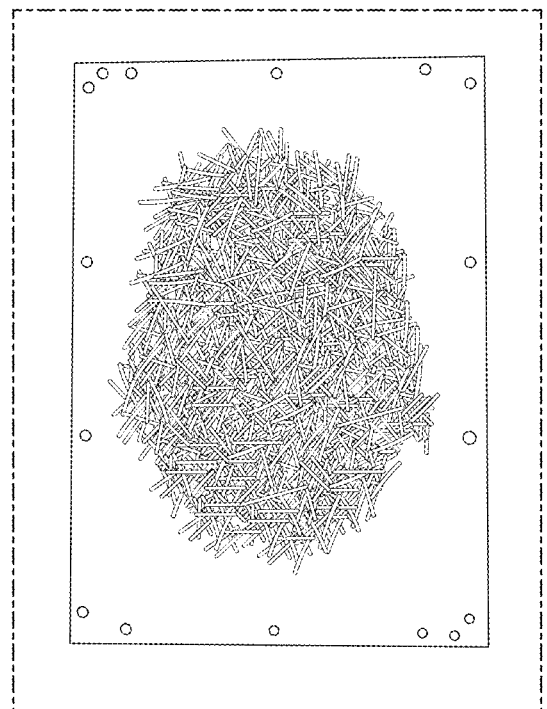
FIG. 5 consisting of FIGS. 5A and 5B, depicts an exemplary method of cutting extruded fiber into a suitable size for re-melting and extrusion.
Figure 5A:
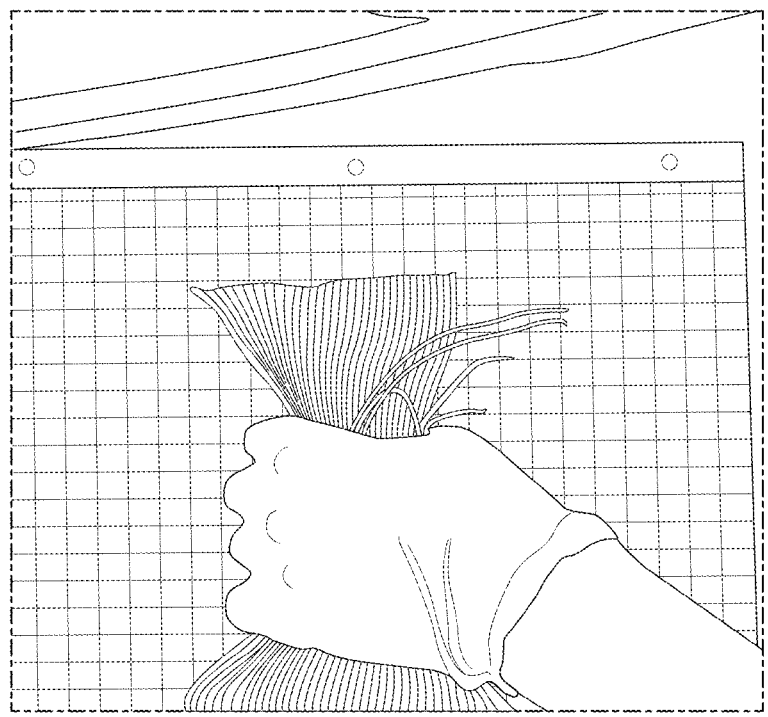

An example of a subsequent pass is shown in FIG. 5. Filaments extruded by the previous pass are cut into short segments having a maximum length, using for example a paper cutter as shown in FIG. 5A. Finished segments are shown in FIG. 5B. The finished segments are then fed back into the extrusion device. Where the filaments are cut, the maximum length may be less than 20 mm. in some embodiments, the maximum length is less than 5 mm.

Figure 6:
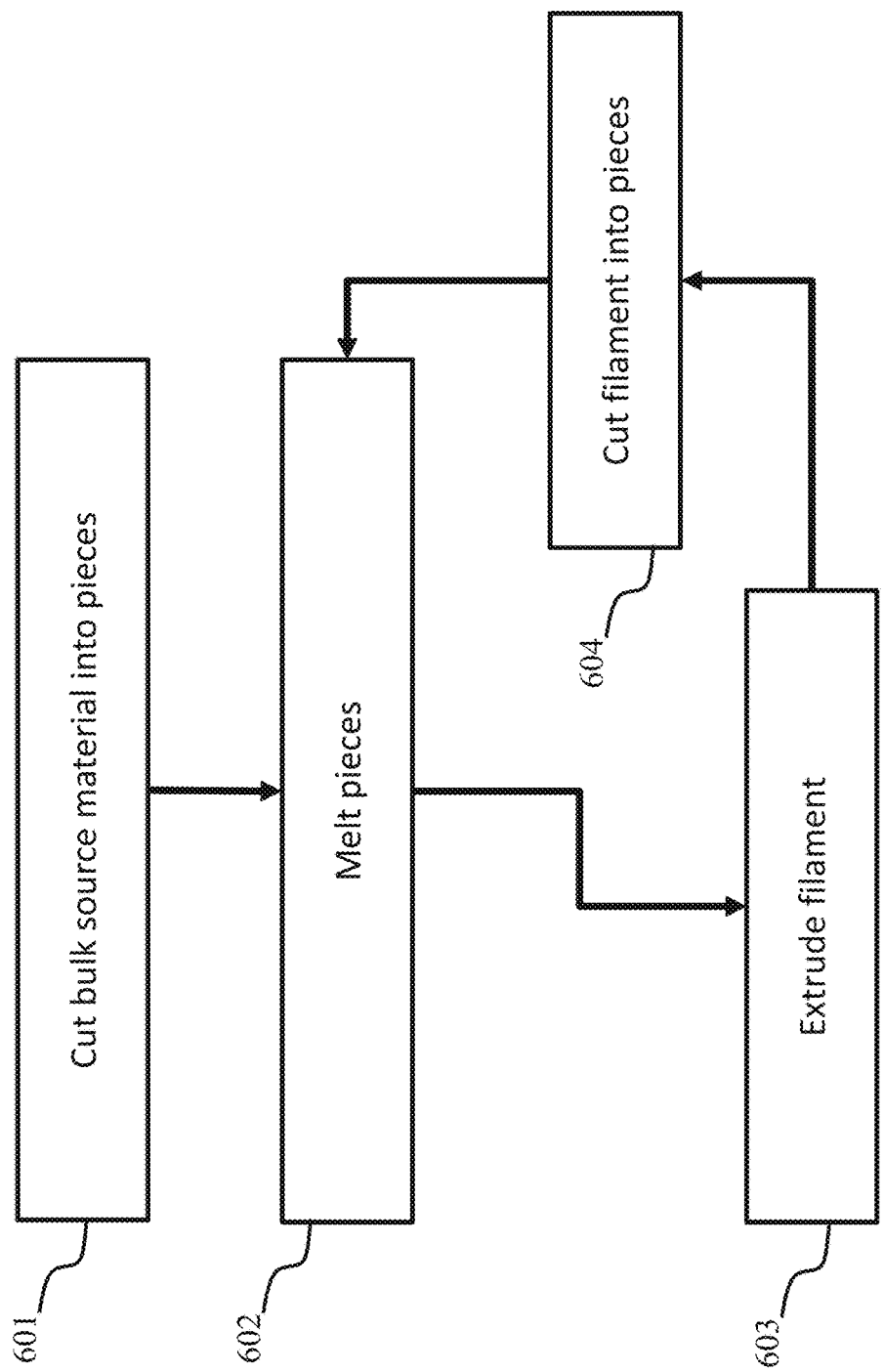
FIG. 6 depicts an exemplary method of the present invention.

As shown in FIG. 6, a method of the present invention comprises the steps of cutting bulk source material into pieces 601, melting the pieces in an extruding device 602, extruding a first filament 603, cutting the filament into pieces 604, then repeating the melting (602) and extruding (603) steps to produce a final filament.

In methods of the present invention, the thermoplastics undergo pressure and shear forces that in some embodiments lead the cenospheres to fail. Since cenospheres provide foam with a high strength-to-density ratio, experimental results are presented in which the material is analyzed for cenosphere breakage after it has been processed and extruded into filament. In some embodiments, methods of the present invention limit cenosphere breakage, and therefore limit the increase the density of the source material, to 5-15%. In some embodiments, it is desirable to extrude filaments with only one pass in order to minimize effort. In other embodiments, the material may be extruded for two or three passes. In some embodiments, three passes of extrusion are conducted and cenosphere breakage is evaluated at the end of each pass by performing scanning-electron microscope (SEM) imaging and taking density measurements. Also presented are the results of an experiment wherein the produced filaments are used to 3D print standard tensile samples. The strength of the produced samples is compared with foam samples manufactured by injection molding to quantify the effects of recycling on the mechanical properties of the filament. HDPE and glass micro balloon syntactic foam are also studied to compare recyclability of the two foams.

As illustrated in the experimental examples below, the multi-pass method described above is advantageous because it allows filaments or syntactic foam components to be recycled again to reduce the load on landfills and reduce the carbon footprint. Therefore, materials that were previously unsuitable for recycling into extruded filament for additive manufacturing can successfully be processed into high-quality filament.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples therefore, specifically point out the preferred embodiments of the present invention, and are not to be construed as limiting in any way the remainder of the disclosure.

Filament Production

Figure 4B:
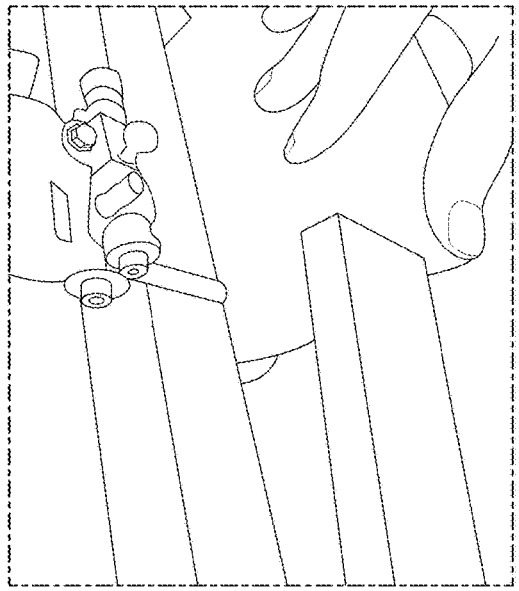
FIG. 4, consisting of FIGS. 4A through 4D, is a series of photographs depicting an exemplary method of cutting a source material to a suitable size.
Figure 4D:
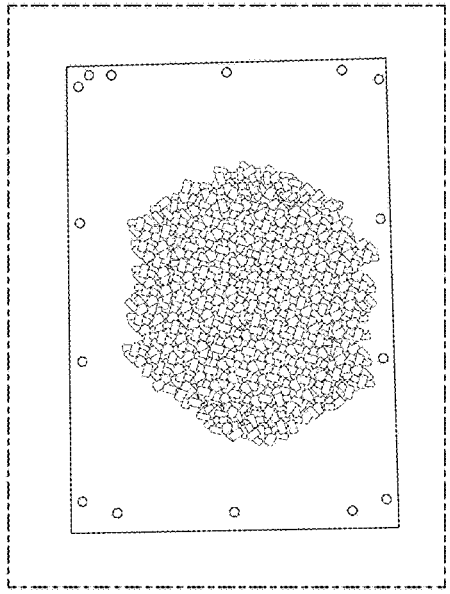
Figure 4A:
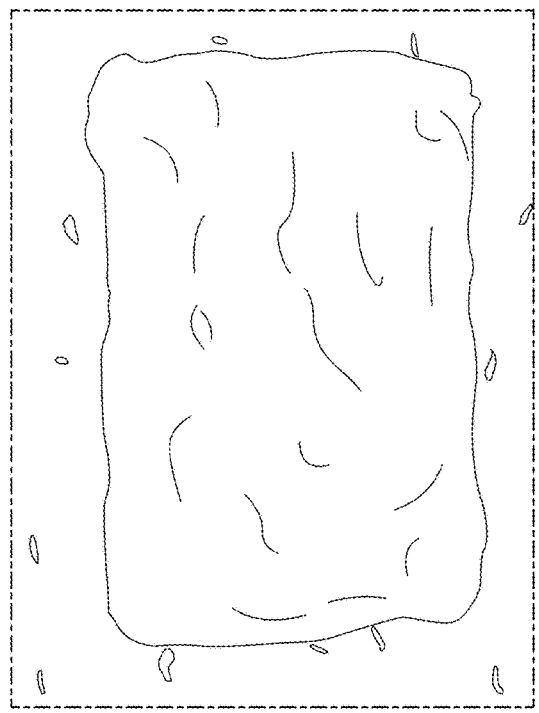
Figure 4C:
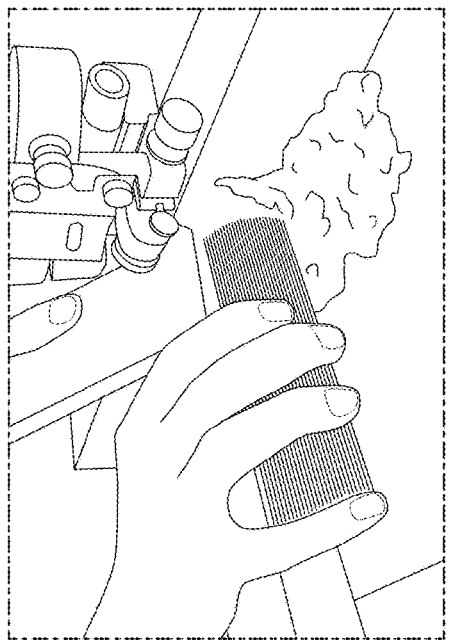

The average density of the HDPE/fly-ash composite material before processing was $0.8071 \pm 0.016$ kg/m$^3$. The large chunks of raw material were melted and spread into large plates with an approximate thickness of 3 mm, as shown in FIG. 4A. The plate was further broken down with a band saw until the material was an appropriate 3×3×3 mm for use with the extruder assembly, as shown in FIG. 4D.

After the first round of extrusion the single-pass filament was broken down for the second round of extrusion, as shown in FIGS. 5A and 5B. The length of filament was removed from the spool and arranged into bundles. The bundles were then cut into small sections using the paper cutter, as shown in FIG. 5A. The sections of material ranged in length from 5-20 mm. Remaining large sections were gathered and re cut to ensure a small average size.

A modified Nortek Pro filament extruder was used to make the filaments. The original design of the extruder had a single heating element controlled by a TA4-SNR temperature controller. FIG. 1A is representative of the original assembly. The extruder is equipped with a single temperature controller and heating element which is mounted to the die. The heater is connected to a rectifier which provides 24V DC. The motor operates on a single speed setting only and is directly coupled to the screw. During the extrusion process on the original Nortek Pro, only the die temperature can be controlled.

Figure 7:
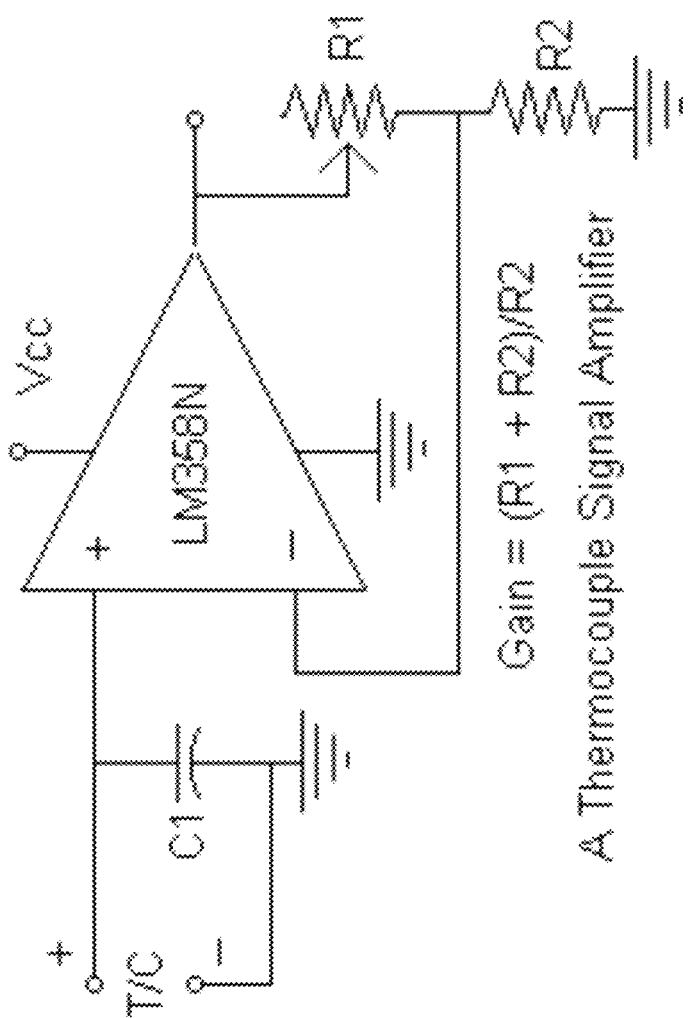
FIG. 7 is a circuit diagram of an exemplary thermocouple amplifier circuit.
Figure 8:
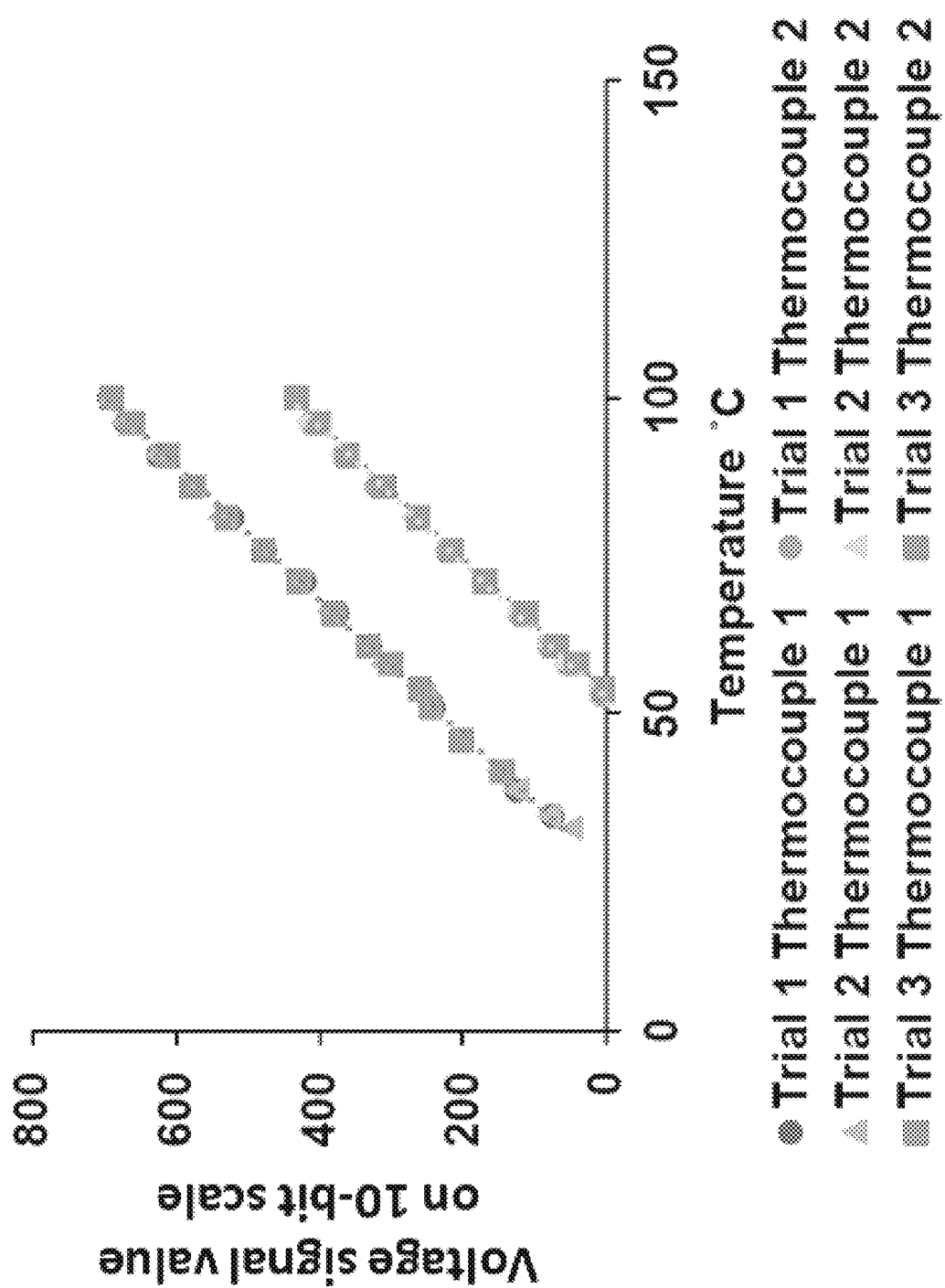
FIG. 8 is a graph of results of thermocouple calibration.

To improve the filament quality, a second heater was mounted to the barrel of the extruder assembly. This addition provides a longer heat cycle which allows more time for heating and mixing of the material. The lower thermal gradients also lead to a more uniform heating which ensures that no non-melted sections of material are present in the extruded filament. To power and regulate the two independent heating elements some modifications were made to the wiring of the original extruder. The TA4-SNR was replaced with two thermocouples, wired through a custom-built amplifier circuit. An exemplary thermocouple signal amplifier circuit is shown in FIG. 7. The resistors R1 and R2 had resistances of 1 M$\Omega$ and 1 k$\Omega$, respectively. The amplified signals were wired to the analog inputs of a standard Arduino Duo, and converted to a digital 10-bit value on a scale from 0 to 3.3V. These digital values were then calibrated to degrees Celsius. The calibration process is shown in FIG. 8, and was performed with several trials of boiling water.

The calibration process comprises a simple linear regression, to produce coefficients to convert the analog signal value to a temperature value in Celsius. An Arduino board continuously monitors the thermocouple signals and checks them against set threshold values input by the operator. If the converted thermocouple signal exceeds the threshold value, the Arduino switches the digital output to the SSR from HIGH to LOW. This change switches the SSR off and disconnects power from the heating elements. As the heating elements and assembly cool, the amplified thermocouple signals decrease proportionally. Once the signals fall below the threshold value the Arduino outputs a HIGH signal to the SSR, which re-enables the heating elements.

Figure 9:
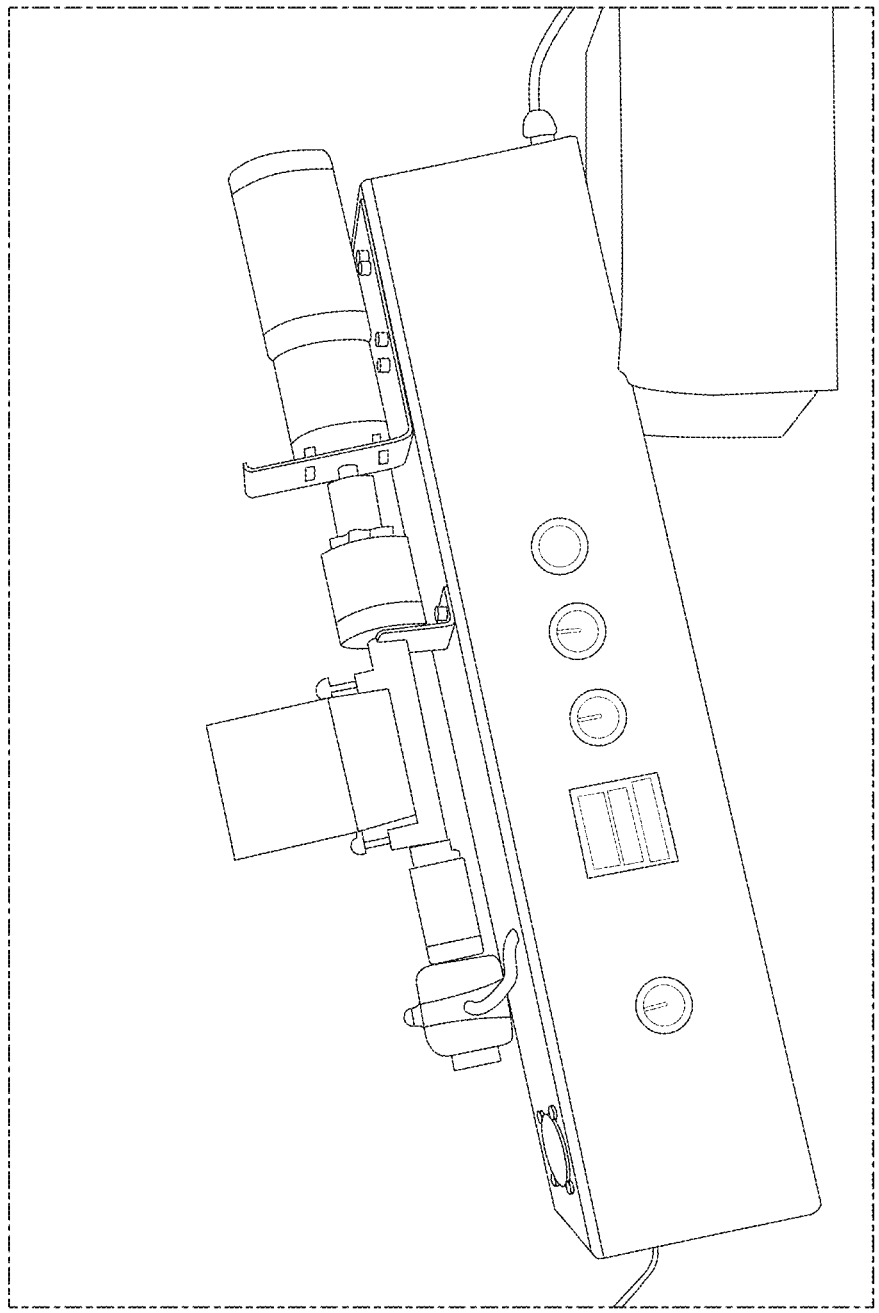
FIG. 9 is an exemplary extrusion device modified according to the present invention.

Other modifications made to the extruder include removing the motor throttle which had been previously installed, and mounting a new hopper. The modified extruder assembly is shown in FIG. 9. A Nortek filament winder was used to spool the extruded filament. The laser system to detect the slack in the extruded material was not used, as manually adjusting the spooling rate allowed for a more homogenous filament diameter.

A Flashforge 3D printer was used for the FDM of the H40 filaments. Irregularity in the filaments caused repeated failure due to jamming, so some modifications were made to the print head to accommodate larger deviations in filament diameter. First, the spring on the filament feeder was cut shorter to reduce the horizontal force which tended to cause large gouges to be formed on the filament. Second, the diameter of the plastic through holes-on the filament feeder were widened with a drill press. This allowed for larger diameter filaments to be fed to the heated die without causing a jam.

The Arduino controller was connected via USB to a computer or other serial monitoring system. The extruder was switched on. With the SSR active, the heaters began to warm the extruder barrel and die. The serial monitor output the analog value as well as the computed temperature value of both heaters.

Once the temperature readout showed that the threshold temperatures has been met, the motor was switched on and extrusion began. The material flow from the nozzle was carefully fed onto the spooling mechanism. During this process, the motor was periodically switched off to keep excess material from being wasted. Once the material was attached to the spool, the system was monitored to ensure that the diameter of the extruded filament was adequate. A faster spooling speed tended to generate thinner filament, and similarly a slower spooling speed tended to produce thicker filament. With some adjustment, a steady state was found wherein the extruded filament was of sufficient diameter and quality. The fan mounted to the assembly was off for most of the extrusion process, however if the material became runny the fan was switched on to accelerate cooling.

When using a 1.75 mm die, filament ranging from 1.5 mm to 2.2 mm was produced with good quality. The barrel temperature was set to 120° C. and the die temperature was set to 127° C. These settings produced homogenous filament with a surface finish similar to samples produced on larger industrial extruders. The effect of higher or lower temperatures has yet to be investigated.

Fused Deposition Modeling (3D Printing)

Prior to printing, the length of filament was checked over for errors and irregularities which may cause a print failure. Sections of poor diameter or quality were cut out of the spool and later recycled for use in a later round of extrusion. Filament of sufficient quality was loaded into the printer using the filament loading functionality of the Flashforge.

The H40 material adhesion to the 3D printer build plate was a major issue for successfully printing a part. During testing, it was found that average quality parts can be produced with the settings in Table 1 below. The temperature of the print head and print bed were set to 250° C. and 125° C. respectively. At this temperature, cupping from the build plate still occurred after a few layers had been printed. To re-adhere the material to the plate, a heat gun was used for small intervals to soften the material and relax and flatten the part.

TABLE 1

| Print Head Temperature | Print Bed Temperature | Object Infill | Feed Rate | Layer Height | Number of Shells |
|---|---|---|---|---|---|
| 250° C. | 125° C. | 100% | 50 mm/s | 0.27 mm | 4 |

Results—Printed Part Testing

Figure 10:
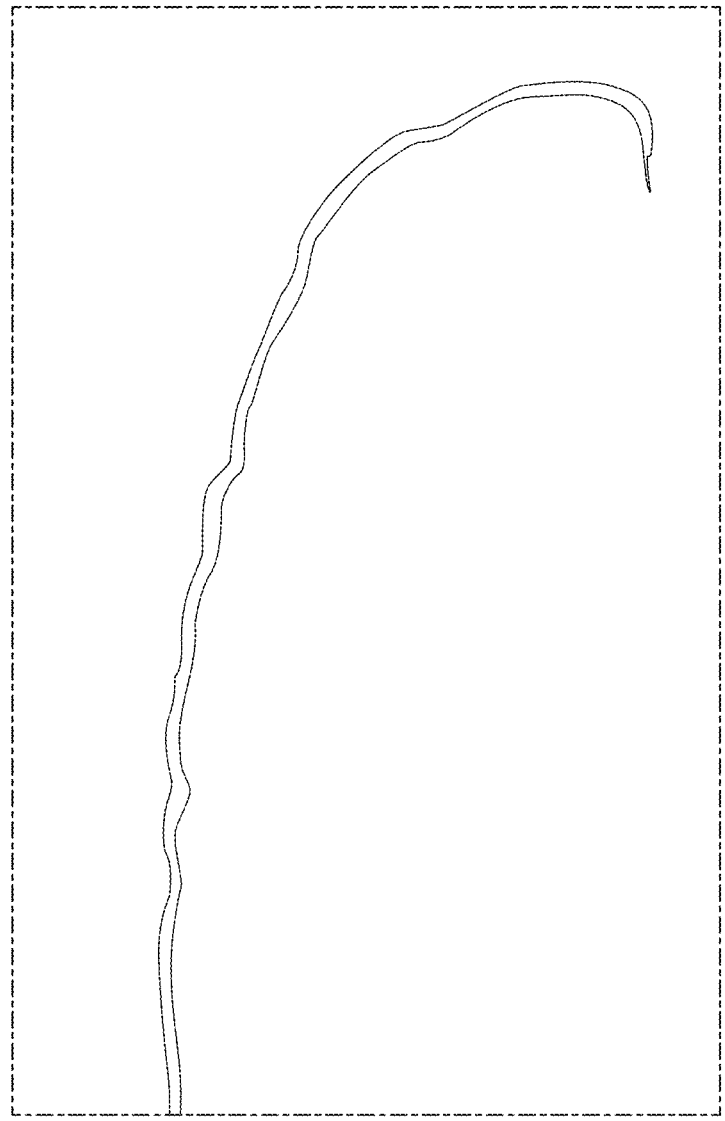
FIG. 10 is a drawing of an exemplary unsatisfactory extruded filament.

Single-pass extruded material was observed to have an irregular cross section and wavy form similar to previous efforts at extruding material. Bending in the material seemed to occur as the filament cooled, which may indicate the effect may be due to thermal expansion. The main problem with the single-pass extruded material was the material flow. The cubes of prepared material were often too large to fit in the barrel. This caused the extrusion process to slow down and become more irregular. A drawing of single-pass extruded material is shown in FIG. 10.

Figure 11:
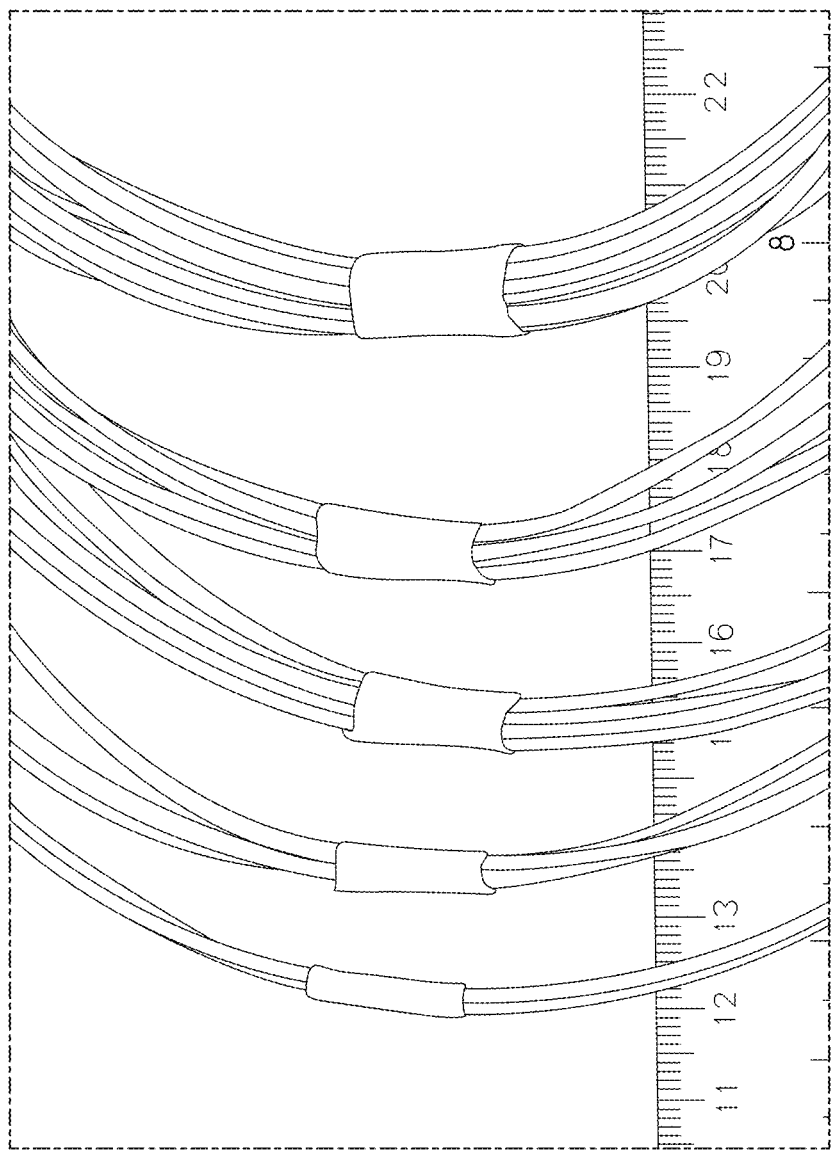
FIG. 11 is a drawing of an exemplary multi-pass extruded filament.

After a second pass, the extruded material far exceeded the single-pass extruded material in terms of filament quality. The significant increase in quality can be at least partially attributed to material preparation. The smaller pieces of material can more easily fit into the barrel of the extruder. This provides a more consistent extrusion and higher mass flow rate. Small changes in temperature and flow rate have lower impact due to their effects being dispersed over a larger length of extruded material. The filaments were produced with a good diameter and surface finish and fewer defects which could lead to print failure. A drawing of two-pass extruded material is shown in FIG. 11.

The three-pass extruded material was similar in quality to the two-pass extruded material, further reinforcing the idea that material preparation has a significant effect on filament quality. The variance in filament diameter and quality found in the two-pass extruded material was similarly found in the three-pass extruded material. Nevertheless, a sufficient length of filament was produced for several parts to be printed.

Five test samples of filament from each round of extrusion were cut using a razor blade. Care was taken to ensure that the resulting volume of filament was approximately cylindrical. The volume was approximated using two measurements of each dimension. Once the volume was known, the mass was measured using a Mettler AE 100 electronic scale and used to calculate the density of the sample. The average value of the five samples from each section of filament was taken as the mean density of the material.

Figure 12:
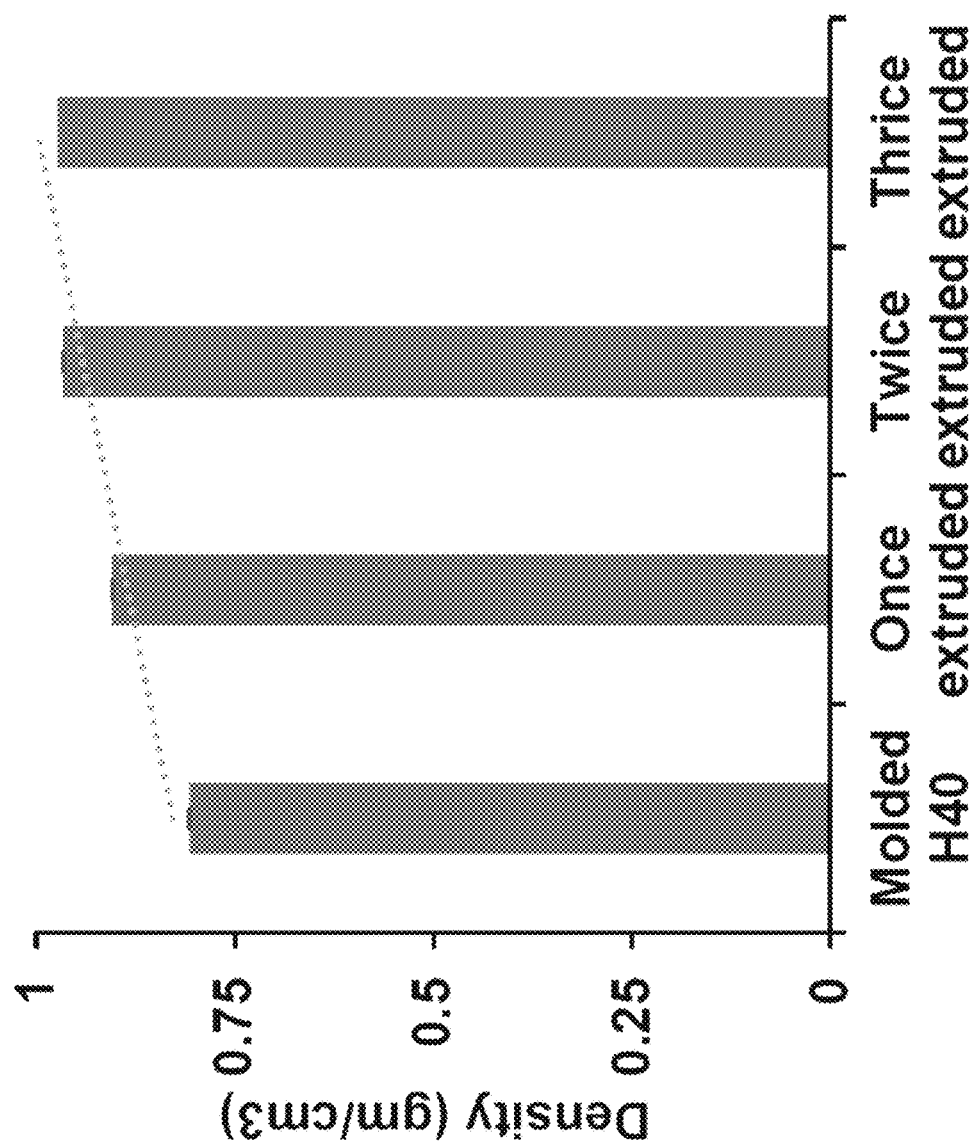
FIG. 12 is a graph of the change in density between passes of filament extrusion.

During each round of extrusion, the H40 material was subjected to high temperatures, high pressures, and strong shear forces. This is expected to cause cenosphere breakage, which in turn causes an increase in density of the material. This is because a ruptured cenosphere no longer displaces matrix and is instead either filled with matrix or shattered to the point of no longer being spherical. The degree of density change from consecutive rounds of extrusion can be seen in FIG. 12. As shown, the present effort was successful in keeping the filament density low. This represents an improvement over previous attempts, which led to the failure of too many particles, leading to high density filament.

Results—Tensile Testing

Figure 13:
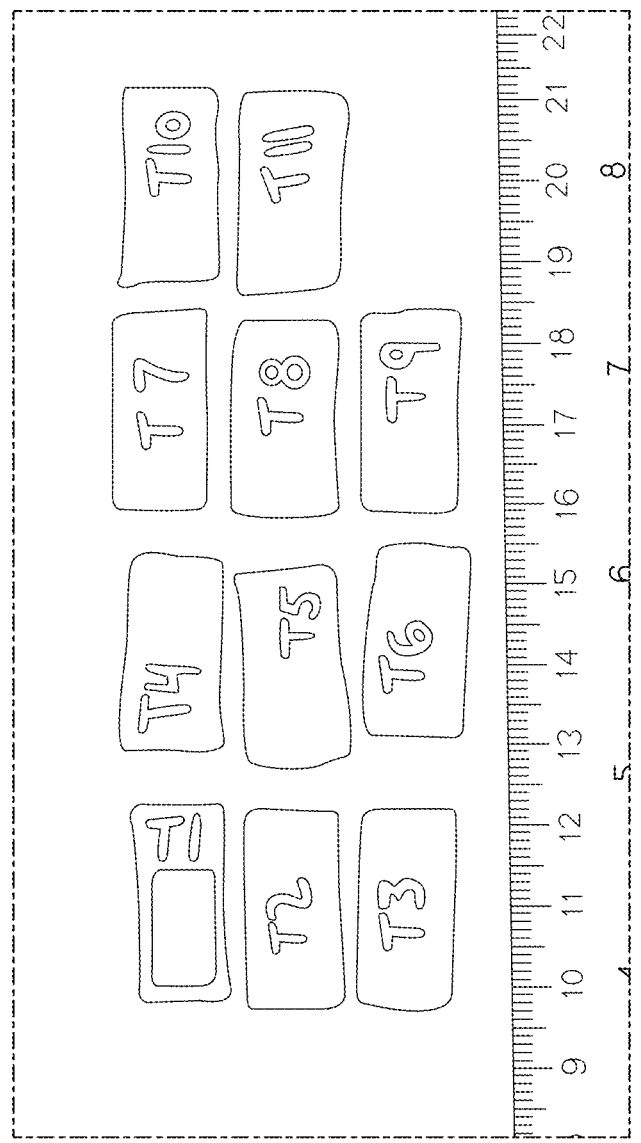
FIG. 13 is a drawing of samples prepared in an experiment.

Two-pass extruded material was first used to find suitable printing settings and to produce tensile tests. Several small samples were produced under various settings, a drawing of the small samples is shown in FIG. 13.

The parts printed from the three-pass extruded material did not differ significantly in performance from the two-pass extruded material. The same printing process used on the two-pass extruded material was used to produce parts and samples from the three-pass extruded material.

ASTM type IV tensile test samples were printed using the fabricated filaments and the Flashforge 3D printer. Three samples each from two- and three-pass extruded filaments were printed and tested. The one-pass extruded material could not be tested because the filament produced was low quality. Better material preparation using a process closer to that of the recycling method will allow for this material to be tested in the future. The samples were mounted to a tensile testing machine. The strain rate used for every round of testing was $0.001$ $s^{-1}$.

Tensile tests were performed on three dogbone samples printed from two- and three-pass extruded material. The single-pass extruded material was not used due to printing difficulty arising from irregularities in the filament. Three dogbone samples each were printed from two- and three-pass extruded filaments. The dogbone samples produced data which was in general agreement, however the cross-sections of the failed parts show an uneven surface with some voids resulting from errors in printing. When analyzing the data, the load was assumed to be acting across a rectangular cross section. This assumption adds to the inaccuracy of the data. Better print quality must be achieved before truly valuable stress data can be collected.

Figure 14A:
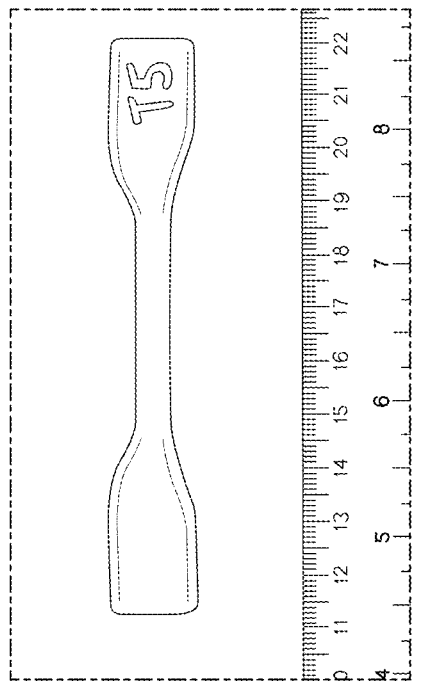
FIG. 14, consisting of FIGS. 14A-14C, is a drawing of tensile testing samples prepared in an experiment.
Figure 14C:
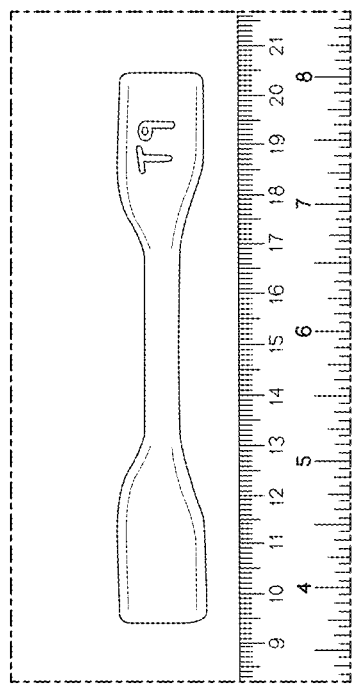
Figure 14B:
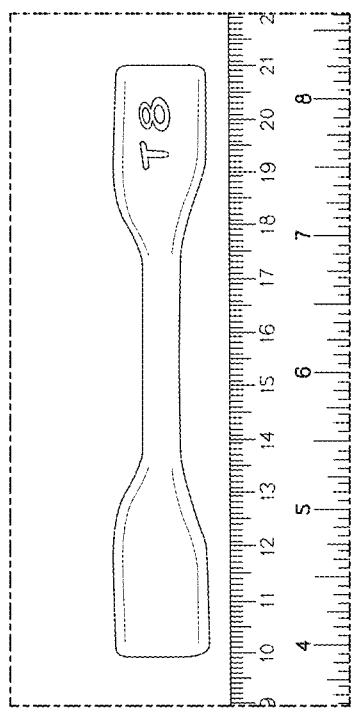
Figure 15:
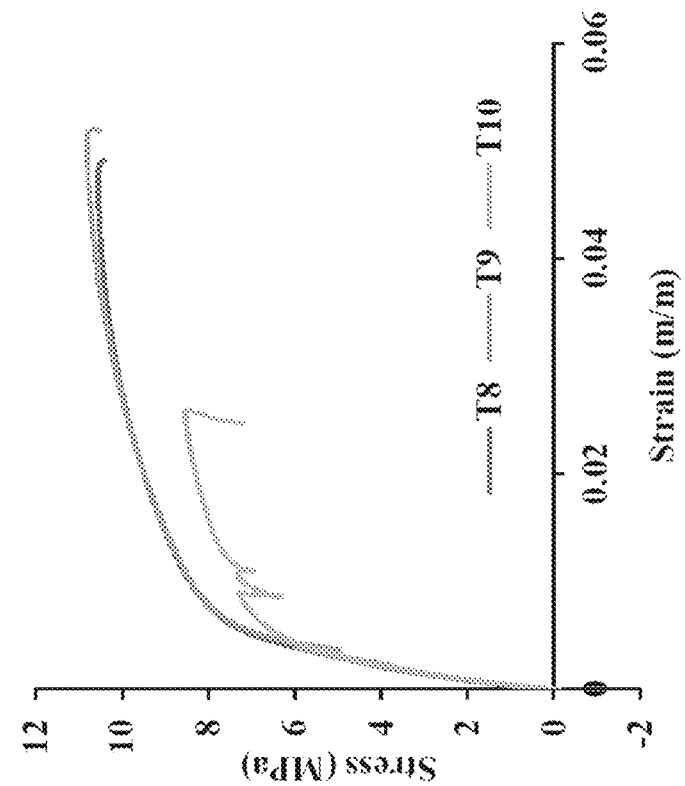
FIG. 15, consisting of FIGS. 15A and 15B, is a graph of the results of tensile testing performed in an experiment.
Figure 15:
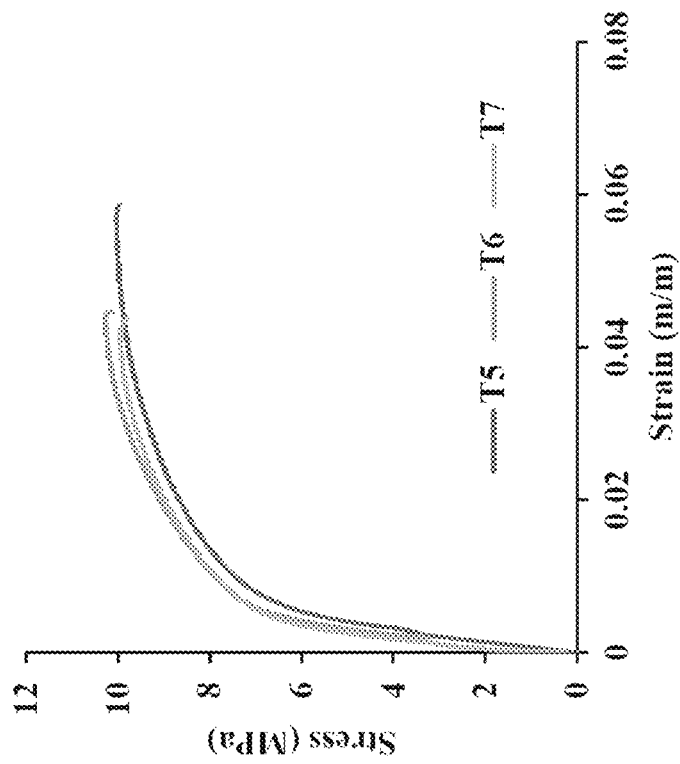

The three dog bone samples are shown in FIG. 14. FIG. 14A shows sample T5, which was printed with two-pass extruded material. FIGS. 14B and 14C show samples T8 and T9, respectively, both of which were printed with three-pass extruded material. Stress-strain diagrams for the tested samples are shown in FIG. 15. FIG. 15A shows the results of tensile testing of the two-pass material, while FIG. 15B shows the results of tensile testing of the three-pass material. The stress-strain diagrams were used to calculate modulus and yield strength values, which are shown in Table 2 below.

TABLE 2

| Sample | Filament Type | Modulus | Yield Strength |
|--------|---------------|---------|----------------|
| T5 | Two-pass | 2.691 GPa | 13.405 MPa |
| T6 | Two-pass | 1.235 GPa | 7.328 MPa |
| T7 | Two-pass | 1.434 GPa | 7.173 MPa |
| T8 | Three-pass | 1.257 GPa | 7.937 MPa |
| T9 | Three-pass | 1.302 GPa | 9.012 MPa |
| T10 | Three-pass | 2.069 GPa | 6.085 MPa |

Filament Imaging

Filaments were first freeze fractured then prepared for SEM. Three samples from each round of extrusion were analyzed and photographed.

The single-pass filament micrographs show good cenosphere distribution and many intact cenospheres. These filaments did exhibit high incidence of air voids in the matrix. Such voids tend to lower the density of the material and may have affected the density measurements. Exemplary micrographs of single-pass filament are shown in FIG. 16, with low magnification shown in FIG. 16A and higher magnification in FIG. 16B. A collection of cenospheres can be seen surrounding a void in FIG. 16B.

Micrographs of two-pass extruded filaments (shown in FIG. 17) seemed indistinguishable from the single-pass extruded filaments in terms of cenosphere breakage and distribution. Both intact and broken cenospheres were observed. Broken cenospheres were observed both shattered and filled with matrix. The size distribution of cenospheres was also like the first round of extrusion, indicating that the size dies not strongly correlate with likelihood of rupture during recycling and extrusion. FIG. 17A shows a low magnification cross section of two-pass extruded filament. FIG. 17B shows a higher-magnification view, in which an intact cenosphere can be seen surrounded by matrix.

Micrographs of three-pass extruded filaments, shown in FIG. 18, exhibit similar properties to the two-pass extruded filaments. Similar modes of cenosphere breakage were observed in both sets of samples. No significant difference in size, distribution and survival rate were observed. FIG. 18A shows a low magnification cross section of three-pass extruded filament. FIG. 18B shows a higher-magnification view, in which a broken cenosphere is shown, seemingly filled with matrix.

CONCLUSION

A modified Nortek extruder was used to extrude high quality HDPE40 filament with a uniform diameter and good surface finish. The best extrusion temperature settings were 120° C. for the barrel of the extruder and 127° C. for the die. Filament quality was found to depend considerably on material preparation. Filament diameter was approximately 1.7 mm with sections as low as 1.5 mm and as high as 2.2 mm. Automatic spooling was found to be impractical for extended use due to a wide range of variables and melt consistencies. Proper heating, mixing and cooling were found to strongly impact the quality filament production.

A modified Flashforge 3D printer was used for FDM of the HDPE40 filaments. The printed parts were of middling quality and required outside interference to adhere to the print bed with current techniques. The best parts were made when the temperature was set to 250° C. for the print head and 125° C. for the print bed. Filament jamming was the single greatest contributor to print failure. Density increased with the number of extrusions due to matrix filling ruptured cenospheres. Mechanical properties between rounds of extrusion were found to be substantially similar, but the printing methods used produced voids in parts which in turn led to early failures.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of extruding filament, comprising the steps of:
producing pieces of source material having size $S_1$;
performing a first extrusion pass comprising the steps of:
melting the first pieces in an extruding device at a temperature $T_1$; and
extruding a first filament from an extruding device having an extrusion screw, at an extrusion speed $V_1$; and
performing at least one additional extrusion pass k comprising the steps of:
cutting the first filament into second pieces having size $S_k$;
melting the second pieces in an extruding device at temperature $T_k$; and
extruding a final filament at an extrusion speed $V_k$;
wherein the matrix porosity of the final filament is less than the matrix porosity of the first filament.

2. The method of claim 1, wherein the source material comprises polymer matrix syntactic foam.

3. The method of claim 2, wherein the source material is HDPE.

4. The method of claim 1, further comprising the steps of:
monitoring at least one temperature on the extruding device; and
activating at least one heater in order to maintain at least one temperature substantially constant.

5. The method of claim 1, wherein the first pieces of source material are produced by cutting a bulk source material.

6. The method of claim 1, wherein the first pieces of source material are produced by melting and casting a bulk source material.

7. The method of claim 1, wherein $T_1$ and $T_k$ are above the glass transition temperature of the source material and below the melting temperature of the source material.

8. The method of claim 1, wherein $S_1$ is less than the pitch of the extruder screw.

9. The method of claim 1, wherein $V_1$ and $V_k$ are between 1 mm/sec and 2 cm/sec.

10. The method of claim 7, wherein $T_1$ and $T_k$ are different values.

11. The method of claim 8, wherein $S_1$ and $S_k$ are different values.

12. The method of claim 9, wherein $V_1$ and $V_k$ are different values.

\* \* \* \* \*